United States Patent Office 3,437,111
Patented Apr. 8, 1969

3,437,111
SHUT-OFF VALVE HAVING MAIN AND
BACK-UP VALVES
Charles E. Grigsby and Chester L. Long, Newport News,
Va., and Alexander V. Hose, Marblehead, Mass., assignors, by direct and mesne assignments, to Newport
News Shipbuilding and Dry Dock Company, Newport
News, Va., a corporation of Virginia
Filed Feb. 10, 1966, Ser. No. 526,487
Int. Cl. F16k 31/44
U.S. Cl. 137—613                                    5 Claims

ABSTRACT OF THE DISCLOSURE

A unitary valve embodying two high-capacity flow valves in series within a single body, the axes of the two valves being at right angles to one another so that their flow passages intersect within the valve body. The valves are slightly off-set in order that the actuating stems for the respective valves may pass one another within the common flow passage between the two valves.

The present invention relates to valves, and more particularly to large-capacity valves of the balanced type, capable of withstanding severe mechanical shock while operating under high fluid pressure.

For some special applications, such as manned vessels operating underwater at considerable depths, any through-hull valves must provide the utmost safety in respect to shut-off capability. In general, it is preferable that such valves have two independently-operating valves in series, with each valve being capable of completely shutting off the flow against the full pressure differential. Furthermore, the construction must be such as to provide great strength, so as to withstand severe mechanical shock without rupture and without distortions that might prevent opening and closing of the valve. It is also important, in view of the requirement of large capacity and high fluid pressure, to make the valves of the balanced or substantially balanced type, so that the actuating mechanisms need develop only moderate power levels to insure proper opening and closing of the valves under operating conditions.

It is therefore an object of the invention to provide a valve which embodies, in a relatively compact configuration of great strength, two high-capacity flow valves in series, both of which are of the pressure-balanced type so as to be readily operated even under high differential fluid pressure, with each valve being capable of effecting complete shut-off of flow independently of the other.

More particularly, it is an object of the invention to provide, in a double valve having both valves substantially balanced to pressure, constructions and configurations of the parts such as to enable the valve to withstand severe mechanical shock while under maximum operating pressure without rupturing or leaking, or distorting in a way that immobilizes the parts against proper opening and closing action.

It is also an object of the invention to provide a valve in which the two valves, conveniently termed main and back-up valves, may be independently and directly actuated by relatively simple mechanisms, the valve configuration and arrangement of the elements being such as to permit disassembly with minimum difficulty for purposes of inspection and repair.

In accordance with the foregoing and other objects as will hereinafter appear, a feature of the present invention is a double valve of novel configuration and construction employing main and back-up valves of the pressure-balanced, sliding sleeve type, which valves are angularly disposed in close relation and in addition have their axes offset so that the actuating members for the individual valves may extend in crossing but non-interfering relation through the valve body to connect with the movable elements of the two valves.

A further feature of the invention involves the provision in a double valve having main and back-up valves, of a valve body wherein great strength to minimize distortions due to severe mechanical shock is provided by reenforcing means which likewise serves to mount, externally of the valve body and in accurate relation to the valve elements within the body, the actuating mechanism for the main valve.

Other objects and features of the invention will appear from the description which follows, taken in conjunction with the accompanying drawings in which FIGURE 1 is a view of the valve in sectional elevation, showing the main valve in closed position and the back-up valve open.

FIGURE 4 is a detail view of the safety locking mechanism for the primary or main valve, employed when the back-up valve is to be disassembled for inspection.

FIGURE 5 is a top plan view, partly in section, of the locking mechanism shown in FIGURE 4.

Figure 1:
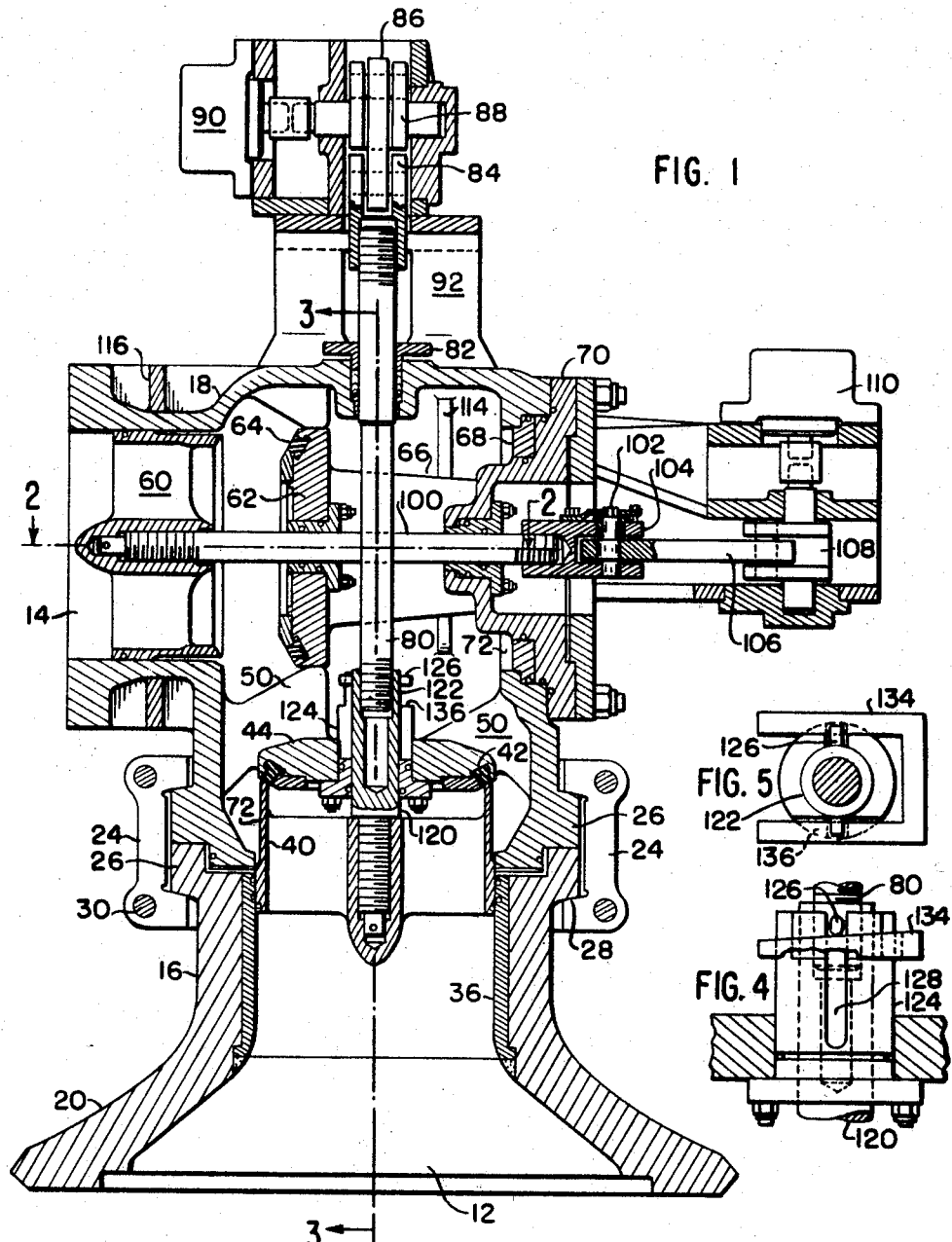
Figure 2:
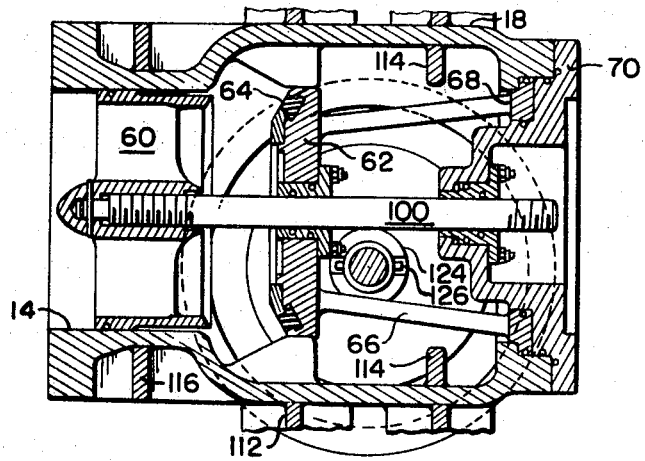
FIGURE 2 is a sectional view taken on the line 2—2 of FIGURE 1, showing the secondary or back-up valve in open position.
Figure 3:
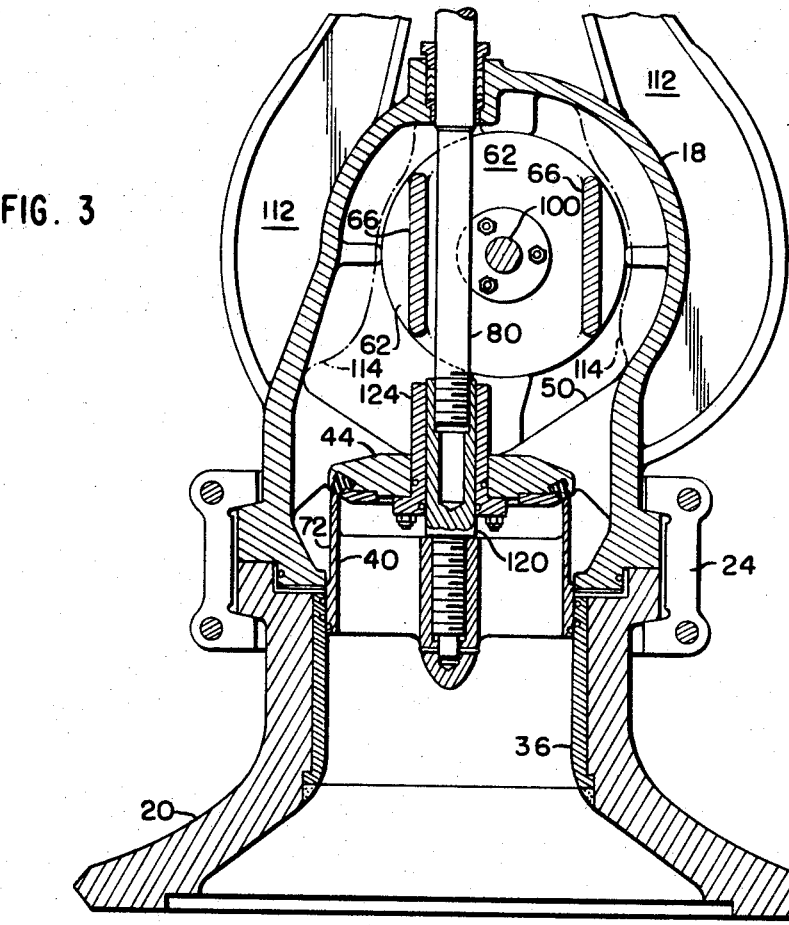
FIGURE 3 is a view in sectional elevation, taken in a direction at a right angle to the direction of view of FIGURE 1, represented by the line 3—3 of said figure.

The invention will be described in terms of a valve having the general configuration shown in FIGS. 1, 2 and 3 wherein the inlet passage is indicated at 12 and the outlet at 14. It will be understood that these terms are employed for convenience in the description which follows, as the valve is also effective to provide flow control and positive shut-off when the flow is in the reverse direction.

The body of the valve is preferably formed in two parts, an inlet section 16 and a main body 18. For purposes of illustration, the inlet section is shown as having a flanged or flaring end 20 for attachment to the wall of a tank or vessel, not shown, by welding or other suitable means. The two sections of the valve body are machined to fit together in suitably-gasketed interlocking and aligned relation, with conventional securing means in the form of a split clamp ring 24 which surrounds the flanged ends 26 of the body sections and applies a powerful clamping action when the sections of the ring 24 are drawn together by bolts 30, by reason of the oblique wedging surfaces 28 extending around the interior of the ring. Preferably the division between the two parts of the valve body is at the inner end of the cylindrical portion of the inlet passage, where a liner sleeve 36 terminates. Here, as at other principal joints in the valve structure as well as in regions of sliding engagement, suitable sealing means are employed that are not specifically identified, being conventional.

The main or primary shut-off valve comprises a sleeve 40 slidable within the liner 36 into and out of engagement with the oblique face of a seat ring 42 secured to the face of seat disc 44. The disc is supported in spaced relation to the inner end of the liner 36 and adjacent margin of the body 18 by means of struts 50 extending inwardly from the walls of the valve body. Thus a flow passage is provided from the inlet passage outwardly around the seat disc when the valve sleeve 40 is moved away from the seat into retracted position within the liner. By reason of the sliding sleeve type of valve, the fluid pressure has little tendency to move the sleeve and the valve is therefore substantially balanced even under high pressures so that relatively low-powered actuating means may be utilized to provide the opening and closing movements of the sleeve.

The back-up valve, likewise of the balanced type, comprises a fixed valve disc and a slidable sleeve, the sleeve 60 sliding within the cylindrical bore which forms the outlet passage 14. The disc 62, to which seat ring 64 is secured, is supported by arms or struts 66 which extend from a ring 68 (see FIG. 2) that is clamped beneath a cover plate 70 over access opening 72 in the valve body. This opening is aligned with the outlet passage 14 and is of a size to permit withdrawal of the valve seat disc 62 therethrough as well as the valve sleeve 60, for purposes of inspection.

It will be noted that both the main valve sleeve 40 and the back-up valve sleeve 60 have their wall portion 72 that is unsupported by the body in closed position of the valve, of somewhat lesser diameter than the wall portion that remains in engagement with the valve body when the valve is closed. As a consequence, should there be any slight expansion of the valve sleeve in the unsupported region of the sleeve in closed position, under the influence of severe pressure shocks, such expansion may be taken up in the sleeve without rendering the valve inoperative due to jamming within the bore.

The main and back-up valves may be closed and opened independently of one another by sliding their respective valve sleeves into engagement with and away from the cooperating oblique seats on discs 44 and 62. In FIG. 1, the main valve is shown in closed position, with the edge of the sleeve 40 seated against seat 42, while the back-up valve is shown in open position with the sleeve 60 retracted into the bore of outlet passage 14 to leave a relatively unobstructed flow passage between the seat disc 62 and the sleeve 60. Similarly, when the main valve is opened by retracting the sleeve 40 into the inlet passage, an annular flow passage of substantial area is provided between seat disc 44 and the valve body.

The opening and closing of the valves is effected by relatively simple mechanisms, and it is a feature of the invention that these mechanisms are arranged in non-interfering relation even though the valves, which may be of large flow capacity, are closely disposed within the valve body. The main valve is opened and closed by a rod 80 connected at its lower end to the sleeve 40 and extending through a stuffing box 82 at the top of the valve body. At its upper end the rod is provided with a yoke 84 to make pivotal connection with a short link 86, the other end of which connects to the crank throw of a crank member 88 that is coupled to a rotary actuator 90. The crank and actuator are mounted on a support 92 secured to the exterior of the valve body. The actuator is controllable by conventional means to rotate the crank very slightly more than 180° and thereby move the sleeve 40 from its fully-closed position to full-open. By adjusting the screw-threaded connections to be described, the sleeve 40 may be caused to be drawn into tight contact with the seat 42 just as the crank throw crosses over its top position, as shown in FIG. 1, to provide a positive lock for the parts in the closed position in the limit position of the crank just beyond top center.

The actuating mechanism for the back-up valve is generally similar. A rod 100 secured at its left end to the valve sleeve 60 extends through seals in valve disc 62 and cover plate 70 to the exterior of the valve body. The outer end of the rod is connected, by means of an eccentric pin 102 through yoke 104 and link 106, to a crank 108. A rotary actuator 110 serves to rotate the crank through 180° to provide the opening and closing movements, as in the case of the main valve. By suitably adjusting the eccentric pin 102, the effective length of the rod 100 and link 106 may be adjusted to cause the valve to be drawn tightly against its seat 64 when the crank throw is at the limit of its movement to the right (substanitally 180° from its position as shown in FIG. 1).

As has been indicated, a feature of the invention is the provision of a dual valve, that is, a valve having main and back-up valves in series, of large flow capacity yet extremely strong, and which is nevertheless of compact configuration. This has been accomplished through the disposition of the main and back-up valves in angular relation, and with their axes slightly off-set rather than lying in the same plane. This off-set, best shown in FIGS. 2 and 3, is such that the actuating rods 80, 100 for the main and back-up valves may cross one another in non-interfering relation. As particularly shown in FIG. 3, it is apparent that the off-set need be relatively small, which results in little distortion or deviation of the flow through the valve, while permitting the rod 80 to pass inwardly of the support struts 66 by which the valve seat disc 62 is suspended within the valve body.

The compact configuration of the valve resulting from the internally-crossed actuating connections makes it possible to provide a valve body of great strength without requiring a massive structure of excessive weight. The short inlet section 20 of the body, as shown in FIGS. 1 and 3, is relatively thick-walled with its flanged end 26 that connects to the upper section disposed outwardly of the region where the sleeve 40 engages liner 36 when the main valve is closed, to provide effective support for the sleeve against severe pressure shocks arriving through the inlet 12.

The region of the body intermediate the two valves is reenforced externally by webbed ribs 112 (see FIG. 3) which extend from just above the flanges 26 upwardly to the platform 92 on which the actuator for the main valve is mounted. These ribs 112 not only provide support against outward distortions of the upper body section 18 under violent pressure shocks but they also serve to position the actuator for the main valve in accurate relationship to the sleeve and seat. Additional reenforcement is afforded by ribs 114 internally of the body, while ribs 116 serve to reenforce the body outwardly of the region of the back-up valve 60.

Reference has already been made to the fact that the valve of the invention has been constructed and arranged to permit removal and inspection of the back-up valve components through the passage that is normally closed by cover 70, without disconnecting the connections to the outlet 14. As a further feature, this disassembly and inspection may be carried out while the main valve remains safely secured in closed position under pressure on the inlet side. To this end, special disconnectible connections and supplementary locking means are provided for the valve sleeve 40 of the main valve.

To provide for the removal of the actuating rod 80 for the main valve sleeve, prior to disassembly and withdrawal of the back-up valve seat disc 62 and sleeve 60, the main valve sleeve is provided with a stub stem element 120. The lower portion of this stub stem is secured within the sleeve 40 by a threaded and cross-pinned connection. The upper stub portion 122 passes in sliding sealing engagement through a cylindrical guide member 124 secured to seat disc 44. The upper portion of the stub stem is provided with opposed projections 126 which slide in slots 128 extending upwardly along the side walls of the cylindrical guide member 124. The top of the stub stem is centrally bored and threaded to receive the threaded end of actuator rod 80.

It will be observed that the top end of the stub stem, in closed position of the main valve, clears the seat disc 62 of the back-up valve to permit lateral withdrawal of the seat on removing cover 70. The sliding pin engagement between stub stem and its guideway serves to anchor the stub stem against rotation when the actuator rod 80 is being disconnected by rotating the rod from outside the valve body after disassembling and removing the actuating mechanism 84, 86, 88 and 90 and the support 92. If the valve is to be opened up for inspection of the back-up valve parts while subjected to shut-off pressure at the inlet, the main valve must be safely secured in closed position prior to removal of the rod 80 by which the sleeve is normally positioned. For such locking of the main valve sleeve, a positive lock in the form of a U-shaped wedge or double key 134 is employed. As best shown in FIGS. 4 and 5, the key 134 is inserted between the underside of projections 126 on the stub stem and surfaces or shoulders 136 on the guide 124. The wedge may be inserted through the opening provided by the removal of cover 70, after which rod 80 may be unscrewed and withdrawn and the back-up valve parts then pulled free. The double wedging action provided by the U-shaped key provides positive and symmetrical support for the stub stem to hold the main valve sleeve 40 securely against its seat.

It is thus apparent that we have provided by our invention a novel construction of a high pressure shut-off valve having the safety of two independent shut-off valves in series yet combined in a single compact body or housing in such a way as to avoid interference between the valves and their separate actuating mechanisms, even to the extent that one of the valves may be disassembled for inspection or replacement of parts while the other valve remains tightly secured against fluid pressure. In particular, the angular disposition of the valves in slightly off-set displacement permits the use of the balanced-pressure sleeve type of valve for both the main and back-up valves, with the result that relatively simple actuating mechanisms may be employed to operate the valves against large unbalance forces. Further, the angular relation of the separate valves enables the body to the made of great strength, with effective support for the movable valve sleeves, so that the valve may withstand severe pressure shocks and resulting mechanical stresses, while subjected to the high fluid pressures incident to normal operation, without leaking and without rendering the valve incapable of opening and closing normally.

We claim as our invention:

1. A high pressure fluid flow control valve having main and back-up valves of the pressure-balanced type, each capable of closing the valve to flow therethrough independently of the other, a valve body having generally circular inlet and outlet passages approximately at a right angle to one another, a chamber within the valve body intermediate the inlet and outlet passages, said passages intersecting one another in a common flow passage within the chamber, said common flow passage being disposed in the same general plane as the inlet and outlet passages, circular valve seats fixed within the chamber in spaced relation to the downstream end of the inlet passage and to the upstream end of the outlet passage respectively, sleeve valves slidably mounted in the inlet and outlet passages, the axis of one valve seat and its sleeve valve being slightly off-set laterally from the axis of the other valve seat and its sleeve valve in a direction perpendicular to said axes, rods connected to the valve sleeves, actuating means outwardly of the chamber for reciprocating said rods along their axes, said rods extending from the valve sleeves through the valve seats and crossing within the common flow passage in the chamber in closely-adjacent off-set relation intermediate the valve seats and the actuating means.

2. A high pressure fluid flow control valve having main and back-up valves of the pressure-balanced type, each capable of closing the valve to flow therethrough independently of the other, a valve body having generally circular inlet and outlet passages approximately at a right angle to one another, a chamber within the valve body intermediate the inlet and outlet passages, said passages intersecting one another in a common flow passage within the chamber, said common flow passage being disposed in the same general plane as the inlet and outlet passages, circular valve seats fixed within the chamber in spaced relation to the downstream end of the inlet passage and to the upstream end of the outlet passage respectively, sleeve valves slidably mounted in the inlet and outlet passages, the axis of one valve seat and its sleeve valve being slightly offset laterally from the axis of the other valve seat and its sleeve valve in a direction perpendicular to said axes, rods connected to the valve sleeves, actuating means outwardly of the chamber for reciprocating said rods along their axes, said rods extending from the valve sleeves through the valve seats and crossing within the common flow passage in the chamber in closely-adjacent off-set relation intermediate the valve seats and the actuating means, the valve body having reenforcing ribs secured to the body around the exterior thereof and extending along the body from the region of the main valve and terminating beyond said body, the actuating means for said main valve being mounted on said reenforcing ribs beyond said body and connected to the actuating rod for the main valve sleeve.

3. A high pressure fluid flow control valve having main and back-up valves of the pressure-balanced type, each capable of closing the valve to flow therethrough independently of the other, a valve body having generally circular inlet and outlet passages approximately at right angles to one another, said passages being off-set one with respect to the other in a direction perpendicular to the axes of said passages, a chamber within the valve body intermediate the inlet and outlet passages, the valve body in a wall of said chamber opposite the outlet passage having an opening approximating the diameter of the outlet passage of the valve and aligned therewith, a removable cover for said chamber opening, a back-up valve seat disc of lesser diameter than said chamber opening, means including spaced arms extending from the valve body inwardly of the chamber opening for supporting said valve seat disc in spaced coaxial relation to the upstream end of the valve outlet passage, a slidable valve sleeve within the outlet passage, an actuating rod secured in said sleeve and extending through valve seat disc and chamber cover, actuating means outside the cover and connected to the rod, a main valve seat disc secured within the chamber in spaced relation to the downstream end of the inlet passage, a main valve sleeve slidable within the inlet passage, an actuating rod for said main valve sleeve, said rod extending through the chamber between the support arms for the back-up valve seat disc in crossing off-set relation to the rod for the back-up valve, and disconnectible connections between the main valve sleeve and its actuating rod to permit withdrawal of said stem outwardly of the body and removal of the back-up valve seat disc and sleeve through the chamber opening.

4. In a high pressure fluid flow control valve having main and back-up valves each capable of closing the valve to flow therethrough independently of the other, a valve body having generally circular inlet and outlet passages approximately at right angles to one another, said passages being off-set one with respect to the other in a direction perpendicular to the axes of said passages, a chamber within the valve body intermediate the inlet and outlet passages, the valve body in a wall of said chamber opposite and aligned with the outlet passage having an opening approximating the diameter of the outlet passage of the valve, a removable cover for said chamber opening, a back-up valve seat disc of lesser diameter than said chamber opening, means including spaced arms extending from the valve body inwardly of the chamber opening for supporting said valve seat disc within the chamber in spaced coaxial relation to the upstream end of the valve outlet passage, a sleeve valve within the outlet passage, an actuating rod secured in said sleeve and extending through valve seat disc and chamber cover, actuating means outside the cover and connected to the rod, a main valve seat disc secured within the chamber in spaced relation to the downstream end of the inlet passage, a main valve sleeve slidable within the inlet passage, an actuating rod for said main valve sleeve, said rod extending through the chamber in the valve body in crossing off-set relation to the rod for the back-up valve between the said stem and the supporting arms for the back-up valve seat disc, a stub stem member secured to the main valve sleeve, said stub stem member having a threaded stub portion extending through the valve seat disc in sliding relation thereto, means for preventing rotation of said stub stem element within the valve seat disc, said stub stem terminating clear of the path of withdrawal of the back-up valve seat disc from the valve chamber toward the chamber opening, and screw-threaded connections between stub-stem member and main valve actuating rod to permit detachment and withdrawal of the rod from the stub stem element from outside the valve body.

5. In a high pressure fluid flow control valve having main and back-up valves each capable of closing the valve to flow therethrough independently of the other, a valve body having generally circular inlet and outlet passages approximately at right angles to one another, said passages being off-set one with respect to the other in a direction perpendicular to the axes of said passages, a chamber within the valve body intermediate the inlet and outlet passages, the valve body in a wall of said chamber opposite and aligned with the outlet passage having an opening approximating the diameter of the outlet passage of the valve, a removable cover for said chamber opening, a back-up valve seat disc of lesser diameter than said chamber opening, means including spaced arms extending from the valve body inwardly of the chamber opening for supporting said valve seat disc within the chamber in spaced coaxial relation to the upstream end of the valve outlet passage, a sleeve valve within the outlet passage, an actuating rod secured in said sleeve and extending through valve seat disc and chamber cover, actuating means outside the cover and connected to the rod, a main valve seat disc secured within the chamber in spaced relation to the downstream end of the inlet passage, a main valve sleeve slidable within the inlet passage, an actuating rod for said main valve sleeve, said rod extending through the chamber in the valve body in crossing off-set relation to the rod for the back-up valve between the said stem and the supporting arms for the back-up valve seat disc, a stub stem member secured to the main valve sleeve, said stub stem member having a threaded stub portion extending through the valve seat disc in sliding relation thereto, said stub stem terminating clear of the path of withdrawal of the back-up valve seat disc from the valve chamber toward the chamber opening, screw-threaded connections between the stub stem member and the actuating rod for the main valve to permit detachment and withdrawal of the rod from the stub stem element, cooperating pin and slot connections for preventing rotation of said stub stem relative to the valve seat disc, and tapered key means insertable between the pin means and the valve seat disc for securing the main valve sleeve in closed position against the valve seat independently of the actuating rod.

References Cited

UNITED STATES PATENTS

| 1,540,209 | 6/1925 | Frazier | 251—366 XR |
| 1,583,427 | 5/1926 | Snow | 251—279 XR |
| 3,142,311 | 7/1964 | Lawrence | 137—508 XR |

FOREIGN PATENTS

| 466,637 | 6/1937 | Great Britain. |

WILLIAM F. O'DEA, *Primary Examiner.*

HOWARD M. COHN, *Assistant Examiner.*

U.S. Cl. X.R.

251—279